(12) United States Patent
Hamada

(10) Patent No.: US 12,255,767 B2
(45) Date of Patent: Mar. 18, 2025

(54) NETWORK SYSTEM AND METHOD

(71) Applicant: CANON KABUSHIKI KAISHA, Tokyo (JP)

(72) Inventor: Hirohiko Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/352,629

(22) Filed: Jul. 14, 2023

(65) Prior Publication Data
US 2024/0039778 A1 Feb. 1, 2024

(30) Foreign Application Priority Data

Jul. 28, 2022 (JP) ................................. 2022-120175

(51) Int. Cl.
*H04L 41/04* (2022.01)
*H04L 41/082* (2022.01)

(52) U.S. Cl.
CPC ............ *H04L 41/04* (2013.01); *H04L 41/082* (2013.01)

(58) Field of Classification Search
CPC .............................. H04L 41/04; H04L 41/082
See application file for complete search history.

(56) References Cited

U.S. PATENT DOCUMENTS

| | | | | |
|---|---|---|---|---|
| 11,819,324 | B2 * | 11/2023 | Cusey ...................... | A61B 5/22 |
| 2008/0301239 | A1 * | 12/2008 | Khijniak ................. | H04L 51/18 |
| | | | | 709/206 |
| 2015/0042447 | A1 * | 2/2015 | Vogt ....................... | G08C 17/02 |
| | | | | 340/4.41 |
| 2021/0084040 | A1 * | 3/2021 | Sakowicz ........... | H04L 63/1425 |
| 2021/0306318 | A1 * | 9/2021 | Yokoyama ............ | H04L 63/083 |
| 2023/0116431 | A1 * | 4/2023 | Wright ................ | H04L 41/0869 |
| | | | | 709/221 |
| 2023/0326565 | A1 * | 10/2023 | Hayter ................... | G16H 10/40 |
| | | | | 705/3 |
| 2023/0328311 | A1 * | 10/2023 | Martin ................... | H04W 4/021 |
| | | | | 725/25 |

FOREIGN PATENT DOCUMENTS

JP 2013114654 A 6/2013

* cited by examiner

*Primary Examiner* — Douglas B Blair
(74) *Attorney, Agent, or Firm* — Canon U.S.A., Inc. IP Division

(57) ABSTRACT

A network system including a device management system configured to provide a first service and a second service which relate to a network device, and the network device having a first function includes a first transmission unit, in the network device, configured to, in response to the first function having been updated, transmit a first request to the device management system by using the first function and a second transmission unit configured to, in response to the registration code having been received and stored, start transmission of data to be used for the second service to the device management system by using a second function of the network device.

7 Claims, 5 Drawing Sheets

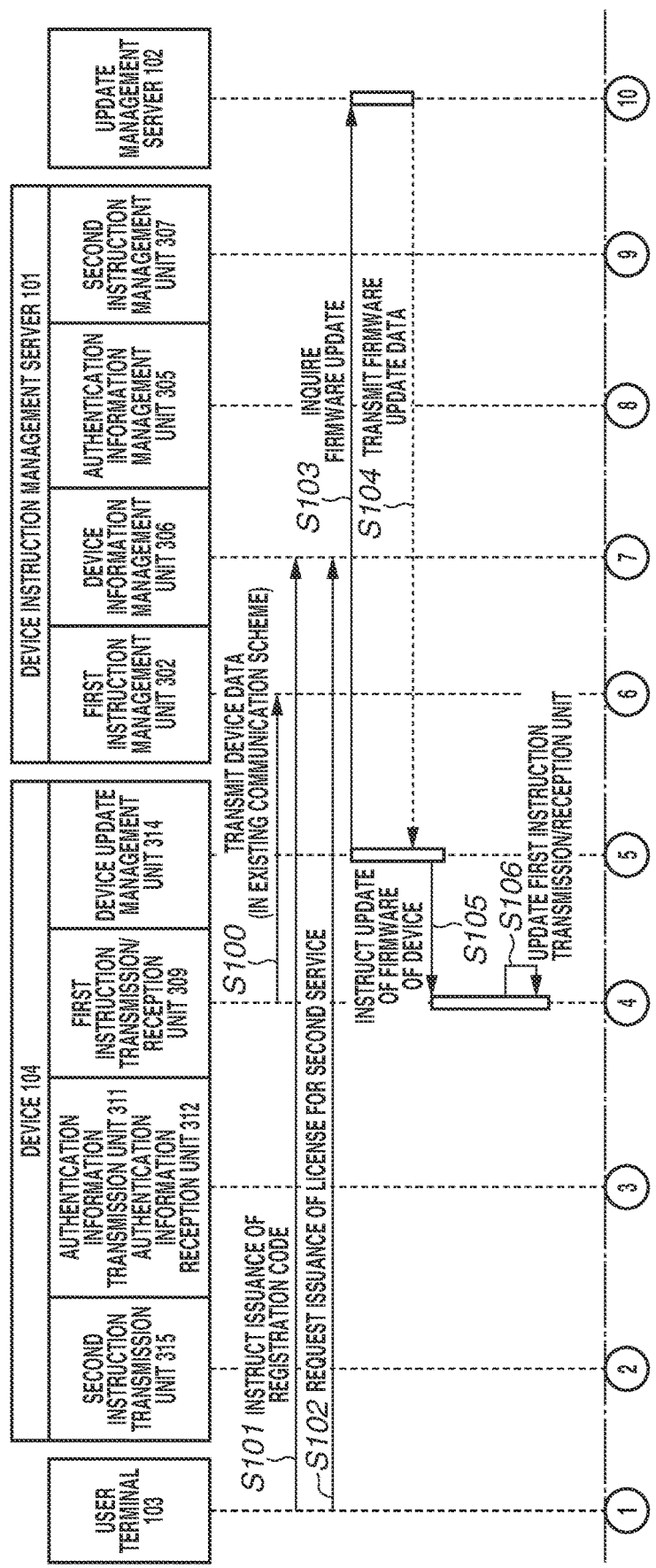

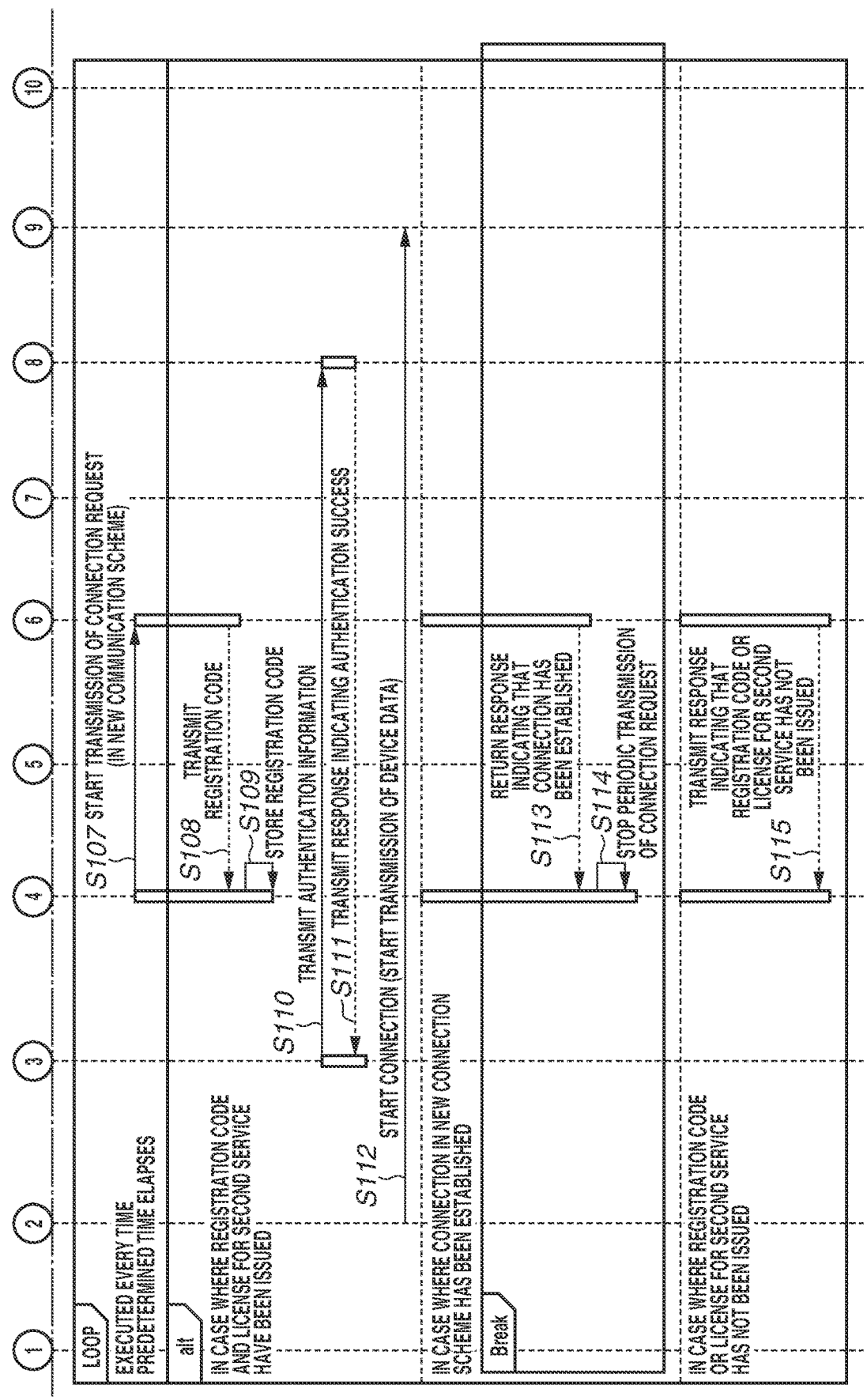

NETWORK SYSTEM AND METHOD

BACKGROUND

Field of the Disclosure

The present disclosure relates to a technique for a device management system to remotely perform device management on a network device through a network.

Description of the Related Art

There is a device management system that manages data of a device owned by a user by mutually communicating with the device in order to provide a service bringing various added values to the device, as discussed in, for example, Japanese Patent Application Laid-Open No. 2013-114654.

In some cases, the device management system introduces a client application into the device or activates the client application in the device, as a new mechanism, in order to improve the service, to additionally introduce a service, to enhance security, and the like. However, a service engineer or the like going to all of devices under management to manually perform an introduction work is costly.

SUMMARY

According to an aspect of the present disclosure, a network system including a device management system configured to provide a first service and a second service which relate to a network device, and the network device having a first function of transmitting data to be used for the first service to the device management system, includes an update unit, in the network device, configured to update the first function, a first transmission unit, in the network device, configured to, in response to the first function having been updated, transmit a first request to the device management system by using the first function, a response unit, in the device management system, configured to transmit a registration code as a response to the first request based on the registration code and a license for the second service having been issued to the network device, and a second transmission unit, in the network device, configured to, in response to the registration code having been received and stored, start transmission of data to be used for the second service to the device management system by using a second function of the network device.

Further features of the present disclosure will become apparent from the following description of exemplary embodiments with reference to the attached drawings.

BRIEF DESCRIPTION OF THE DRAWINGS

FIGS. 4A and 4B are, in combination, a diagram illustrating a sequence of processing in a system according to one or more aspects of the present disclosure.

DESCRIPTION OF THE EMBODIMENTS

An exemplary embodiment according to the present disclosure is described below.

Figure 1:
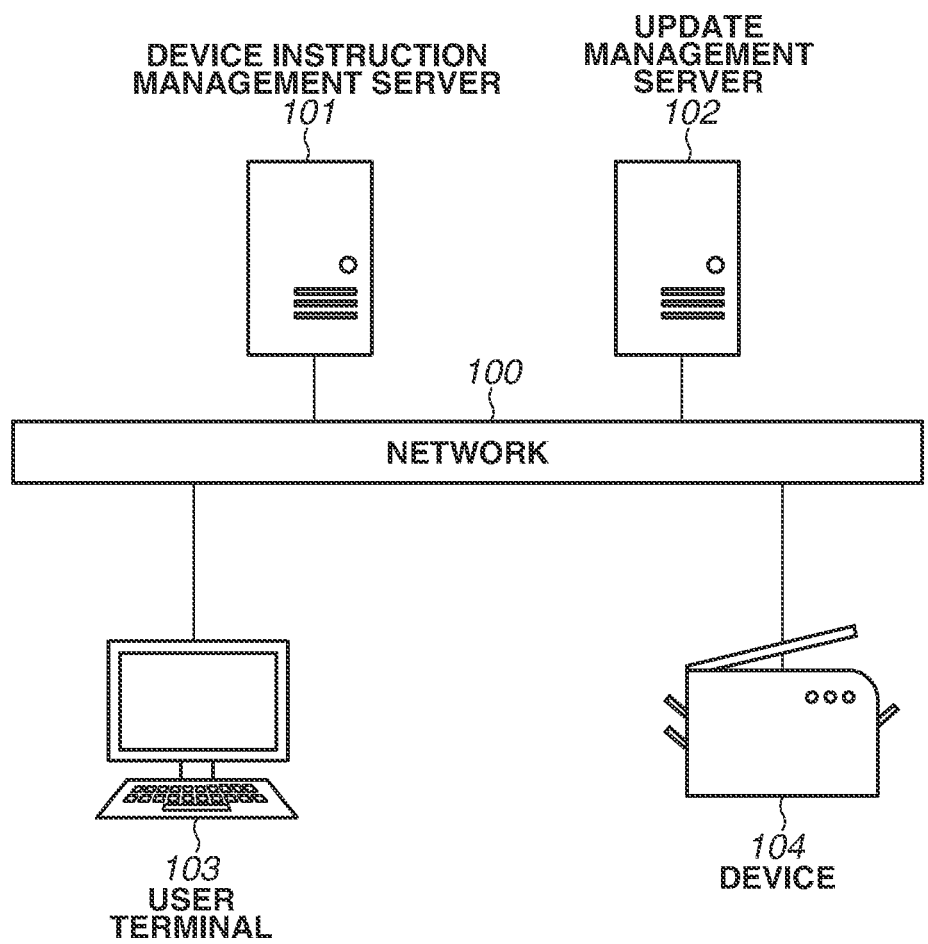
FIG. 1 is a diagram illustrating an example of a system configuration.

FIG. 1 is a diagram illustrating an entire configuration of a network system according to the exemplary embodiment of the present disclosure.

In FIG. 1, a device instruction management server 101, an update management server 102, a user terminal 103, and a device 104 are connected via a network 100. A device management system is a system for providing a plurality of services, and mutually performs communication for a service contracted by a user serving as each individual unit of customer, with a device owned by the user. Further, the device management system at least includes the device instruction management server 101 in order to realize communication with a network device to be managed, in one or more communication schemes for each service. The device management system is constructible with the update management server 102 included.

The network 100 is a communication network, realized by, for example, the Internet, a local area network (LAN), a wide area network (WAN), a telephone line, a dedicated digital line, an asynchronous transfer mode (ATM), a frame relay line, a cable television line, or a data broadcasting wireless line. It is sufficient for the network 100 to perform transmission and reception of data. In particular, a communication via a firewall provided in a local network environment which are provided for a device user and in which the device 104 is installed is assumed as the communication between the device 104 and the device instruction management server 101. Thus, it is assumed that the network 100 in such a case includes the Internet.

The device 104 is an example among a plurality of network devices managed by the device management system, and similar control described below according to the exemplary embodiment is realized for the other network devices.

The device instruction management server 101 receives an instruction to the device 104 and a device identification (ID) from the user terminal 103, and stores the instruction to the device 104 and the device ID. In response to receiving an inquiry from the device 104, the device instruction management server 101 searches for all of instructions to be transmitted to the device 104 from among recorded and managed instructions by using the device ID of the device 104, and transmits found instructions to the device 104. In response to receiving, from the device 104, a processing result of the instruction processed by the device 104, the device instruction management server 101 updates information on the corresponding instruction.

The update management server 102 has a function of transmitting firmware update data to the device 104.

The user terminal 103 is an apparatus such as a common personal computer (PC). The user terminal 103 has a function of transmitting, to the device instruction management server 101, the device ID indicating an instruction transmission destination and the instruction to the device 104, and an environment for executing an application realizing such a function.

The device 104 is an apparatus having a function of receiving an instruction from the user terminal 103 via the device instruction management server 101 and performing processing of the instruction, and a function of transmitting device data such as operation information on the device to the device instruction management server 101. The device 104 inquires of the update management server 102 about device update information. In response to receiving the update information as a response to the inquiry, the device 104 performs the received instruction.

In the following, the functions of each of the servers described in the present exemplary embodiment may be realized by a single server or a single virtual server, or may be realized by a plurality of servers or a plurality of virtual servers. Alternatively, a plurality of virtual servers may be performed on a single server. The device management system may be designed on a cloud infrastructure based on a cloud computing technique.

Figure 2A:
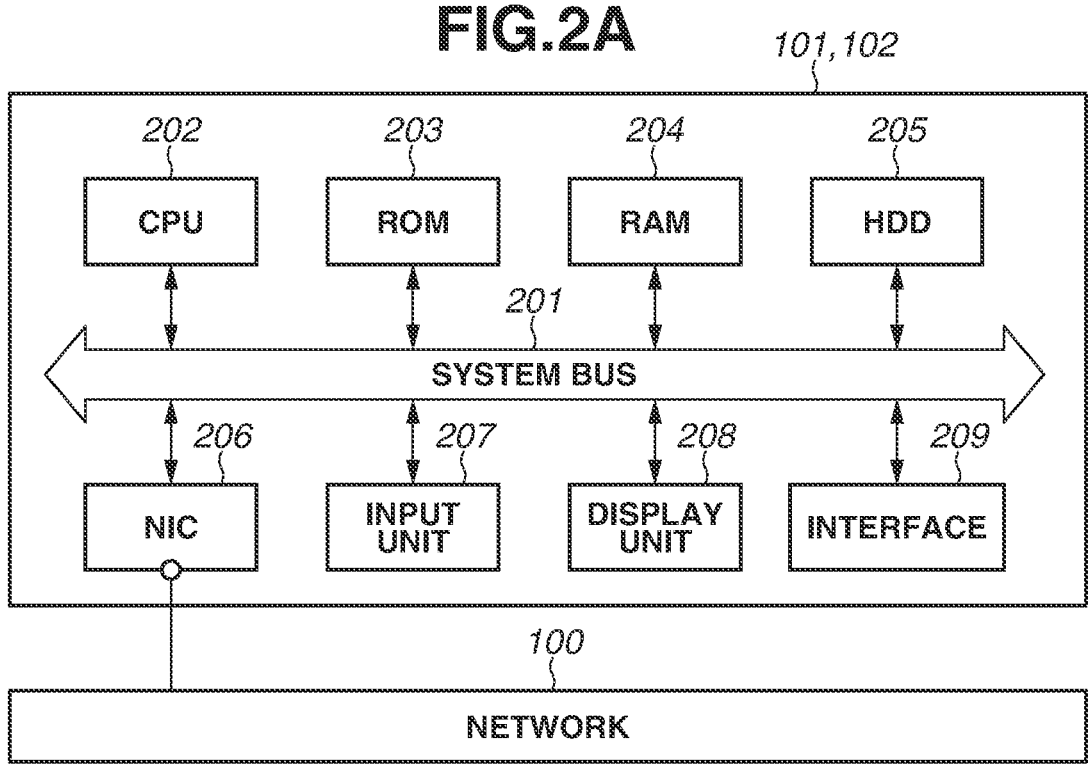
FIGS. 2A and 2B are diagrams each illustrating an example of a hardware configuration.
Figure 2B:
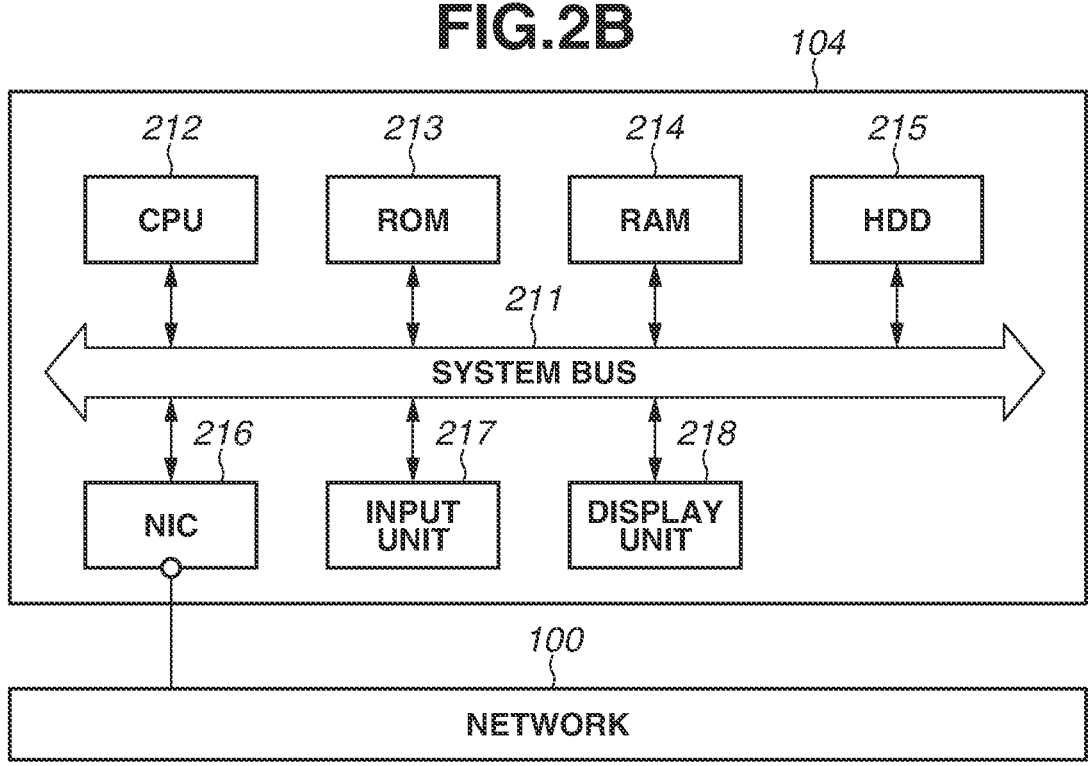

FIGS. 2A and 2B are diagrams illustrating hardware resources of apparatuses included in the device management system in FIG. 1.

FIG. 2A is a diagram illustrating a configuration example of hardware included in an information processing apparatus, such as the device instruction management server 101, the update management server 102, and the user terminal 103, according to the exemplary embodiment of the present disclosure.

In FIG. 2A, a central processing unit (CPU) 202 controls the entire apparatus. The CPU 202 executes application programs, an operating system (OS), and the like stored in a hard disc drive (HDD) 205, and performs control to temporarily store information, files, and the like to be used for execution of the programs, in a random access memory (RAM) 204. The CPU 202 includes programs stored in a read only memory (ROM) 203, and generally controls devices via a system bus 201.

The system bus 201 manages a data flow in the apparatus.

The ROM 203 is a storage unit, and functions as a work area and the like. The HDD 205 is one of external storage units, functions as a large capacity memory, and stores the application programs, such as a web browser, programs for service servers, the OS, relating programs, and the like.

An input unit 207 is an instruction input unit, such as a keyboard and a mouse. A display unit 208 displays a command and the like input from the input unit 207. An interface 209 is an external apparatus interface (I/F) to which a universal serial bus (USB) device and a peripheral device are connected. A network interface card (NIC) 206 exchanges data with an external apparatus via the network 100.

Figure 3:
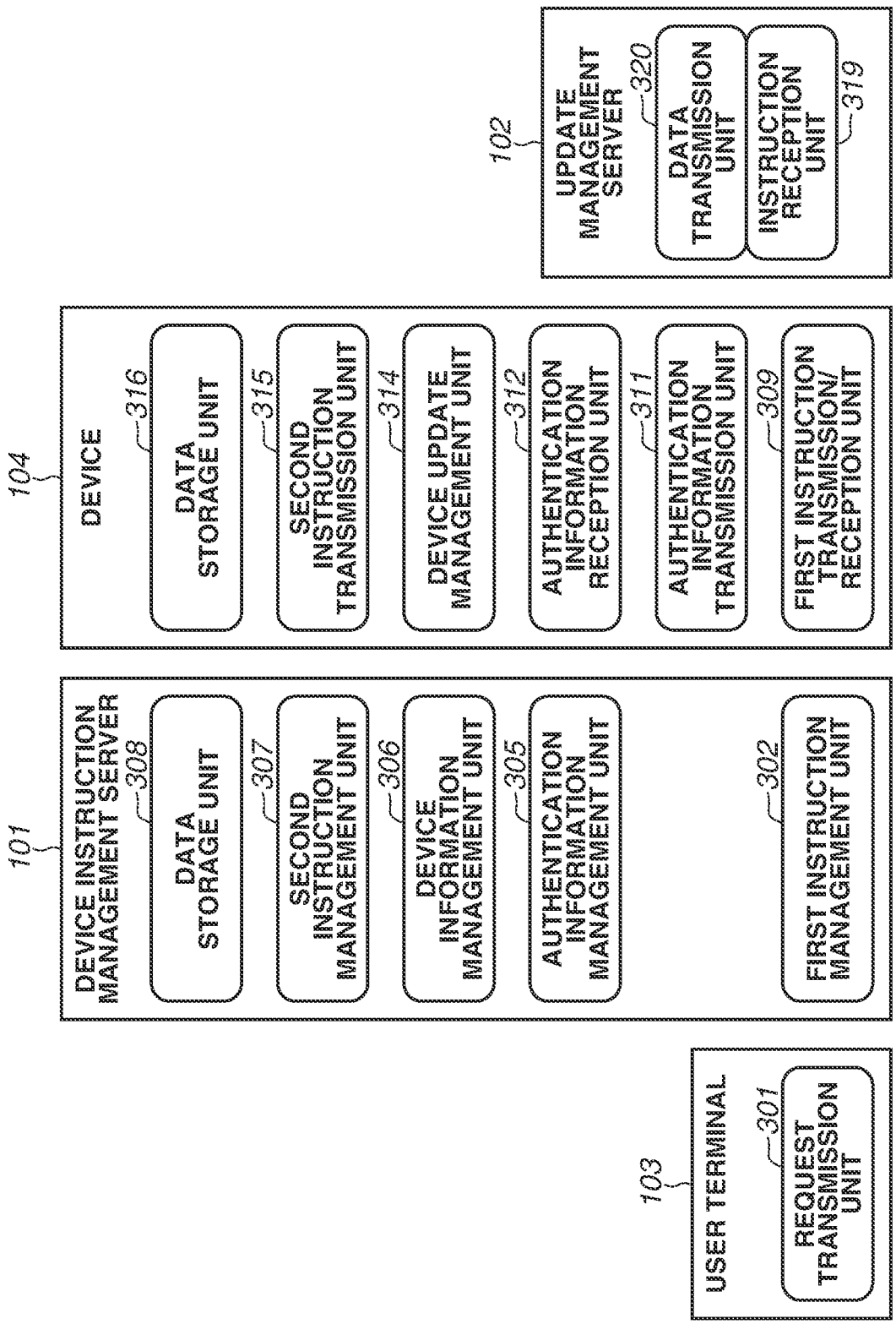
FIG. 3 is a diagram illustrating an example of a software configuration.

The above-described configuration of the computer is illustrative, and the configuration of the computer is not limited to the configuration example in FIG. 2A. For example, a storage destination of the data and the programs can be changed among the ROM 203, the RAM 204, the HDD 205, and the like based on features. In addition, when the CPU 202 performs processing based on the programs stored in the HDD 205, processing in a software configuration illustrated in FIG. 3 is realized.

FIG. 2B is a diagram illustrating an example of a hardware configuration held by the device 104.

The device 104 is applicable to an apparatus such as a digital multifunctional peripheral, a facsimile apparatus, a laser beam printer, an inkjet printer, and a scanner apparatus. In FIG. 2B, a CPU 212 controls the entire apparatus via a system bus 211. The system bus 211 manages a data flow in the apparatus.

The CPU 212 executes application programs, an OS, and the like stored in an HDD 215, and performs control to temporarily store information, files, and the like to be used for execution of the programs, in a RAM 214. A ROM 213 is a storage unit, and functions as a main memory, a work area, and the like for the CPU 212. The HDD 215 functions as an external storage device, functions as a large capacity memory, and stores the application programs, such as a web browser, programs for service servers, the OS, relating programs, and the like. An NIC 216 unidirectionally or bidirectionally exchanges data with an external network apparatus or a PC via the network 100.

An input unit 217 is an instruction input unit, such as a keyboard and a mouse. A display unit 218 is a display or the like, and displays a command and the like input from the input unit 217 including the keyboard and the mouse.

The above-described configuration of the computer is illustrative, and the configuration of the computer is not limited to the configuration example in FIG. 2B. For example, a storage destination of the data and the programs can be changed among the ROM 213, the RAM 214, the HDD 215, and the like based on features. In addition, when the CPU 212 performs processing based on the programs stored in the HDD 215, processing in a software configuration illustrated in FIG. 3 is realized.

FIG. 3 is a diagram illustrating an example of a module configuration of software included in each of the apparatuses according to the present exemplary embodiment.

The device instruction management server 101 includes a first instruction management unit 302, an authentication information management unit 305, a device information management unit 306, a second instruction management unit 307, and a data storage unit 308.

The device instruction management server 101 has a function of receiving the device data, such as operation information about the network device transmitted from the device 104, and storing the device data with identification information about the network device in a storage system (not illustrated) by the data storage unit 308. The device instruction management server 101 further has a function of receiving an instruction request transmitted from the device 104, and returning a response to the device 104. The device instruction management server 101 has a function of, in response to receiving an instruction request for the network device from the user terminal 103, storing an instruction corresponding to the instruction request with identification information about a target network device in the storage system (not illustrated) by using the data storage unit 308. The storage system is realized using a storage unit in the information processing apparatus serving as the device instruction management server 101, or a storage unit of an apparatus that is connected to the device instruction management server 101 via the network and provides a storage service.

The first instruction management unit 302 receives the device data, such as the operation information about the network device which is handled by a first service currently supporting the device 104, from the device 104 via a communication using an existing communication scheme. Further, the first instruction management unit 302 is able to receive a connection request for a second service which is a new service, from the device 104. The first instruction management unit 302 transmits a determination result regarding registration with the second service, to the device 104.

The authentication information management unit 305 receives authentication information from an authentication information transmission unit 311. The authentication information management unit 305 collates and verifies the authentication information, and transmits a response indicating authentication success or authentication failure to an authentication information reception unit 312.

The device information management unit 306 receives an instruction request for grant of license for newly using the second service, from a request transmission unit 301. The device information management unit 306 further receives a request for issuance of a registration code of the device instruction management server 101.

The second instruction management unit 307 receives the device data, such as the operation information about the device to be handled by the second service, transmitted from a second instruction transmission unit 315.

The data storage unit 308 stores in the storage service information about each of the network devices in association with device identification information (device ID), and manages the information in order to manage each of the network devices. More specifically, the data storage unit 308 stores the instructions, the operation information about the devices, and the device data that have been received by the first instruction management unit 302, the device information management unit 306, and the second instruction management unit 307.

The update management server 102 includes an instruction reception unit 319 and a data transmission unit 320.

The update management server 102 has a function of receiving a firmware update request from the device 104, and returning firmware update data.

The instruction reception unit 319 has a function of receiving an inquiry about firmware update from a device update management unit 314, and instructing the data transmission unit 320 to transmit the firmware update data. The data transmission unit 320 transmits the firmware update data to the device update management unit 314.

The user terminal 103 includes the request transmission unit 301. The user terminal 103 includes the request transmission unit 301 that transmits, to the device instruction management server 101, the instruction request for new grant of the license for the second service and the instruction request for issuance of the registration code of the device instruction management server 101.

The device 104 includes a first instruction transmission/reception unit 309, the authentication information transmission unit 311, the authentication information reception unit 312, the device update management unit 314, the second instruction transmission unit 315, and a data storage unit 316.

The first instruction transmission/reception unit 309 is configured to perform a communication using the existing communication scheme for the first service. The second instruction transmission unit 315 is a function for using the second service.

The first instruction transmission/reception unit 309 transmits the device data, such as the operation information about the device 104, to the first instruction management unit 302 by using the existing communication scheme. After update corresponding to the processing of the device update management unit 314 described below in conjunction with FIGS. 4A and 4B is performed, the first instruction transmission/reception unit 309 supports a new communication scheme, and has a function of controlling transmission of a connection request for the second service. The first instruction transmission/reception unit 309 receives the determination result regarding the registration with the second service from the first instruction management unit 302 as a response to the connection request. In a case where the determination result regarding the registration with the second service indicates success, the first instruction transmission/reception unit 309 stores a registration code included in the response, in the data storage unit 316.

The authentication information transmission unit 311 has a function of reading the determination result regarding the registration with the second service from the data storage unit 316, creating authentication information from the determination result regarding the registration with the second service, and transmitting the authentication information to the authentication information management unit 305. The authentication information reception unit 312 has a function of receiving the response indicating authentication success or authentication failure from the authentication information management unit 305.

The device update management unit 314 has a function of inquiring of the instruction reception unit 319 of the update management server 102 whether firmware update is present. The device update management unit 314 has a function of receiving the firmware update data from the data transmission unit 320, and updating the first instruction transmission/reception unit 309 of the device 104 by using the firmware update data.

The second instruction transmission unit 315 has a function of transmitting, to the second instruction management unit 307, the device data, such as the operation information about the network device, to be used for the second service.

The data storage unit 316 has a function of storing, in a storage device of the device 104 itself, the registration code stored by the first instruction transmission/reception unit 309 and the authentication information received by the authentication information reception unit 312.

Next, a sequence of processing performed between the device management system and the device 104 which is a network device to be managed according to the present exemplary embodiment is described with reference to FIGS. 4A and 4B.

In step S100, the first instruction transmission/reception unit 309 of the device 104 transmits the device data, such as the operation information about the device, handled by the existing service, to the first instruction management unit 302 of the device instruction management server 101. This is processing routinely performed by the network device capable of establishing communication with the device instruction management server 101 in the existing communication scheme, based on a predetermined schedule and an internal event (error occurrence, power supply event, etc.). Thus, the transmission of the device data through this communication may be performed in asynchronization with the subsequent processing in the sequence.

In step S101, the request transmission unit 301 of the user terminal 103 transmits the instruction request for issuance of the registration code to the device information management unit 306 of the device instruction management server 101 in accordance with a user operation.

In response to receiving the instruction request for issuance of the registration code for the device instruction management server 101, the device information management unit 306 of the device instruction management server 101 stores a value indicating that the registration code has been issued to the target device, in a device registration management table via the data storage unit 308. Table 1 illustrates an example of the device registration management table managed by the data storage unit 308.

TABLE 1

| Device Registration Management Table | | | |
|---|---|---|---|
| Device Id | Registration Code Issuance | Second Service License | New Communication Scheme |
| 12345 | Issued | Issued | Established |
| 12347 | Issued | Issued | Not established |
| 67890 | Issued | Not issued | Not established |
| 12348 | Not issued | Issued | Not established |

TABLE 1-continued

Device Registration Management Table

| Device Id | Registration Code Issuance | Second Service License | New Communication Scheme |
|---|---|---|---|
| 12349 | Not issued | Not issued | Not established |
| . | . | . | . |
| . | . | . | . |
| . | . | . | . |

A device ID column stores a value that is unique identification information for each network device.

In a case where issuance of the registration code has been instructed from the user terminal 103 to the device instruction management server 101, a value indicating that "registration code has been issued" is managed in a registration code issuance column. In a case where issuance of the registration code has not been instructed from the user terminal 103, a value indicating that "registration code has not been issued" is managed in the registration code issuance column.

A second service license column stores a value indicating whether the instruction request for grant of the license for the second service has been received from the target device. The instruction request for grant of the license is transmitted from the request transmission unit 301 of the user terminal 103 to the device information management unit 306 of the device instruction management server 101. In a case where the instruction request has been received, the second service license column stores a value indicating that "license has been issued." In a case where the instruction request has not been received yet, the second service license column stores a value indicating that "license has not been issued."

A new communication scheme column stores information indicating whether the connection request using the new communication scheme for starting the use of the second service with the target device has been performed and transmission of data to be used for the second service has been started. In a case where transmission of the data to be used for the second service from the target device has been started, the new communication scheme column stores a value indicating that "connection has been established." Otherwise, the new communication scheme column stores a value indicating that "connection has not been established." The value is updated from the value indicating that "connection has not been established" to the value indicating that "connection has been established" at a timing when the operation in step S111 described below is performed or at a timing when communication in step S112 to be described below is started.

In step S102, the request transmission unit 301 of the user terminal 103 transmits the instruction request for grant of the license for the second service, to the device instruction management server 101 in accordance with a user operation.

The device information management unit 306 of the device instruction management server 101 updates the device registration request table via the storage unit 308 in response to receiving the instruction request for grant of the license for the second service. More specifically, the information in the second service license column relating to the device 104 in the table illustrated in Table 1 is updated from the value indicating that "license has not been issued" to the value indicating that "license has been issued."

In step S103, the device update management unit 314 of the device 104 inquires of the instruction reception unit 319 of the update management server 102 whether firmware update is available. The inquiry is performed by the device update management unit 314 periodically or in response to a user operation.

In step S104, based on reception of the inquiry in step S103, the data transmission unit 320 of the update management server 102 transmits the firmware update data to the device update management unit 314 of the device 104. At this time, in a case where the firmware to be updated is absent in the target device, data indicating that update is unnecessary may be returned.

In step S105, the device update management unit 314 of the device 104 instructs the first instruction management unit 302 to perform update using the received firmware update data. At this time, the firmware of the device 104 and software relating to the first instruction management unit 302 may be updated, or only the software relating to the first instruction management unit 302 may be updated, based on the update instruction.

In step S106, the device update management unit 314 updates the first instruction transmission/reception unit 309 of the device 104 by using the firmware update data. As a result, a function of communicating with the first instruction management unit 302 of the device instruction management server 101 using the new communication scheme is added to the first instruction transmission/reception unit 309 of the device 104.

In step S107 after completion of the update process in step S106, the first instruction transmission/reception unit 309 of the device 104 starts periodic transmission of a connection request using the new communication scheme, to the first instruction management unit 302 of the device instruction management server 101. In place of the periodic transmission, it is sufficient to start transmission process for transmitting the connection request a plurality of times after update of the first instruction management unit 302 at a timing based on a predetermined schedule, at a timing when software is started up, or the other timing.

The device instruction management server 101 that has received the connection request using the new communication scheme refers to information about the target device on the device registration management table (Table 1) managed by the data storage unit 308, and determines whether values of the license for the second service and the registration code indicate "Issued".

In step S108, the first instruction management unit 302 of the device instruction management server 101 refers to the device registration management table. In a case where an instruction to issue the registration code has been issued and the grant of the license for the second service has been issued, the first instruction management unit 302 of the device instruction management server 101 transmits the registration code to the device 104 as a response to the connection request.

In step S109, the first instruction management unit 302 of the device 104 stores the registration code in the data storage unit 316.

In step S110, the authentication information transmission unit 311 of the device 104 transmits authentication information for authentication of the device 104, to the authentication information management unit 305 of the device instruction management server 101 with storage of the registration code in the data storage unit 316 of the device 104 as a trigger. If the authentication processing based on the authentication information received in step S110 is successful, then in step S111, the authentication information management unit 305 of the device instruction management server 101 transmits a response indicating authentication success to the authentication information reception unit 312 of the device 104. The response includes an authorization token for the second instruction transmission unit 315 of the device 104 to connect to the device management system. The authentication information management unit 305 issues the authorization token.

In step S112, the second instruction transmission unit 315 of the device 104 determines that the authentication has been completed, based on reception of the response indicating the authentication success in step S111, and transmits a request for starting of the connection, to the second instruction management unit 307 of the device instruction management server 101. The request includes the above-described authorization token which is used for the second instruction management unit 307 to verify a communication source. Thereafter, when connection is successful, the second instruction transmission unit 315 of the device 104 starts transmission of the device data for the second service.

Next, as for the connection request performed in step S107, two cases where the values of the license for the second service and the registration code do not indicate "issued" are described with reference to the device registration management table (Table 1).

In a first case, in step S113, the first instruction management unit 302 of the device instruction management server 101 refers to the device registration management table (Table 1), and specifies that the value in the new communication scheme column indicates that "connection has been established." In this case, the first instruction management unit 302 transmits a response indicating that the connection has been started, to the first instruction transmission/reception unit 309 of the device 104.

In step S114, the first instruction transmission/reception unit 309 stops the periodic transmission of the connection request using the new communication scheme in response to receiving the response indicating that the connection has been started. This makes it possible to prevent useless communication.

In a second case, in step S115, the first instruction management unit 302 refers to the device registration management table (Table 1), and specifies that one or both of the value indicating that the registration code has not been issued and the value indicating that the license for the second service has not been issued are managed. In this case, the first instruction management unit 302 transmits a response indicating that one or both of the registration code and the license for the second service have not been issued, to the first instruction transmission/reception unit 309 of the device 104.

Even if the response indicating that one or both of the registration code and the license for the second service have not been issued is received, the first instruction transmission/reception unit 309 does not stop the periodic transmission of the connection request using the new communication scheme. This is because it is assumed that the processing relating to issuance of the registration code or the processing relating to issuance of the license for the second service is delayed. When the periodic transmission is continued, the operations in steps S108 to S112 are automatically realized when the issuance is thereafter performed in the device management system.

Even after the operation in step S112 or S114 is completed, the transmission process in step S100 performed by the device 104 using the existing communication scheme is continuously performed unless a stop process is separately performed.

A specific example of the second service is described. Examples of the second service that can be newly introduced to the device 104 include a service that collectively manages a state of consumables such as toner, a security state, and an operation state of the network device. For the service, the device 104 transmits the state of the consumables thereof, security setting information thereabout, and the like to the device instruction management server 101 through the operation started in step S112. The second service creates a web page using the use state of the consumables, the security state, and the operation state stored by the device instruction management server 101, thus providing the web page to the user of the device 104.

Examples of the first service include a service for managing the states of the consumable items, such as toner, of the device 104, and automatically instructing delivery of a new consumable item for replacement to an installation place of the device 104 as necessary. In such a case, data of a remaining amount of the consumable item used by the device 104, and the like is transmitted from the device 104 to the device instruction management server 101.

Other Exemplary Embodiment

The present disclosure also includes an apparatus or a system configured by appropriately combining the above-described exemplary embodiments, and a method therefor.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present exemplary embodiment, it is possible to start a new service while reducing a dispatch cost of a service engineer and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-120175, filed Jul. 28, 2022, which is hereby incorporated by reference herein in its entirety.

What is claimed is:

1. A network system including a device management system providing a first service and a second service which relate to a network device, and the network device having a first function of transmitting data to be used for the first service to the device management system:
   wherein the network device comprises one or more memories storing instructions and one or more processors capable of executing the instructions causing the network device to:
   update the first function, wherein a new communication scheme is added to the updated first function to transmit a first request for receiving a registration code for the network device;
   in response to the first function having been updated, start to transmit the first request to the device management system by using the new communication scheme of the updated first function; and
   wherein the device management system transmits, as a response to the first request, the registration code to the network device in a case where management information of the network device indicates that a license for the second service has been issued to the network device,
   wherein the instructions further cause the network device to:
   in response to the registration code having been received from the device management system, transmit information for device authentication of the network device to the device management system;
   receive an authorization token using for a verification of the network device as a communication source from the device management system;
   start transmission of data to be used for the second service to the device management system by using a second function of the network device and the authorization token, and
   in a case where the registration code is not received from the device management system, continue to transmit the first request to the device management system by using the new communication scheme.

2. The network system according to claim 1, wherein the updated first function starts a transmission process for transmitting the first request to the device management system a plurality of times.

3. The network system according to claim 2,
   wherein, based on the second function having started transmission of the data to be used for the second service to the device management system, the device management system transmits a response indicating that the transmission of the data has been started, and
   wherein, in the network device, the transmission process by the updated first function is stopped in response to receiving the response indicating that the transmission of the data has been started.

4. The network system according to claim 1, wherein the first request is transmitted for the network device to automatically start use of the second service.

5. The network system according to claim 1, wherein the device management system, based on a request for grant of a license for the second service, updates the management information of the network device so that the management information indicates that the license for the second service has been issued to the network device.

6. The network system according to claim 1, wherein, in a case where the registration code is not received from the device management system, continue to transmit the first request without transmission of the information for the device authentication of the network device to the device management system.

7. A method for a network system including a device management system providing a first service and a second service which relate to a network device, and the network device having a first function of transmitting data to be used for the first service to the device management system:
   updating the first function, wherein a new communication scheme is added to the updated first function to transmit a first request for receiving a registration code for the network device;
   in response to the first function having being updated, start to transmit the first request to the device management system by using the new communication scheme of the updated first function of the network device; and
   wherein the device management system transmits, as a response to the first request, the registration code to the network device in a case where management information of the network device indicates that a license for the second service has been issued to the network device,
   wherein the instructions further cause the network device to:
   in response to the registration code having been received from the device management system, transmit information for device authentication of the network device to the device management system;
   receiving an authorization token using for a verification of the network device as a communication source from the device management system;
   starting transmission of data to be used for the second service to the device management system by using a second function of the network device, and the authorization token, and
   in a case where the registration code is not received from the device management system, continue to transmit the first request to the device management system by using the new communication scheme.

* * * * *